United States Patent
Naber et al.

(10) Patent No.: US 10,696,422 B2
(45) Date of Patent: Jun. 30, 2020

(54) METHOD AND SYSTEM FOR DEPOSITING AND CHECKING OF BAGGAGE INTO AIRLINE FLIGHTS

(71) Applicant: SITA Ypenburg BV, Delft (NL)

(72) Inventors: Jorick Naber, Haarlem (NL); Leander Henricus Albertus Ross, Delft (NL); Reinout Vander Meülen, Delft (NL); Bart René Yvonne Houlleberghs, 's-Gravenhage (NL); Roel Reijnen, Rotterdam (NL)

(73) Assignee: SITA YPENBURG B.V., Delft (NL)

( * ) Notice: Subject to any disclaimer, the term of this patent is extended or adjusted under 35 U.S.C. 154(b) by 1527 days.

(21) Appl. No.: 14/390,670

(22) PCT Filed: Apr. 3, 2013

(86) PCT No.: PCT/NL2013/050251
§ 371 (c)(1),
(2) Date: Oct. 3, 2014

(87) PCT Pub. No.: WO2013/151436
PCT Pub. Date: Oct. 10, 2013

(65) Prior Publication Data
US 2015/0095254 A1 Apr. 2, 2015

(30) Foreign Application Priority Data
Apr. 5, 2012 (NL) .................................... 2008607

(51) Int. Cl.
*G06K 9/18* (2006.01)
*G06Q 10/02* (2012.01)
(Continued)

(52) U.S. Cl.
CPC .............. *B64F 1/366* (2013.01); *B64F 1/368* (2013.01); *G06K 9/18* (2013.01); *G06Q 10/02* (2013.01);
(Continued)

(58) Field of Classification Search
CPC ............................... G06K 19/00; G07B 15/00
(Continued)

(56) References Cited

U.S. PATENT DOCUMENTS

| 4,137,567 A | 1/1979 | Grube |
| 5,178,227 A | 1/1993 | Kvisgaard et al. |

(Continued)

FOREIGN PATENT DOCUMENTS

| CA | 2186076 A1 | 4/1997 |
| CN | 101107676 A | 1/2008 |

(Continued)

OTHER PUBLICATIONS

International Search Report and Written Opinion dated Mar. 13, 2013 (PCT/NL2013/050251); ISA/EP.

(Continued)

*Primary Examiner* — Edwyn Labaze
(74) *Attorney, Agent, or Firm* — Morris, Manning & Martin, LLP; Daniel E. Sineway, Esq.; Adam J. Thompson, Esq.

(57) ABSTRACT

The invention relates to a baggage drop system for depositing and checking of baggage into airline flights. The system comprises a conveyor (1), equipped with a static or dynamic weighing scale (17), comprising multiple, spaced apart load cells (18), and computing means adapted to compare the output of the weighing scale (17) with allowable baggage weights, and a substantially horizontal frame member (2'), mounted above the first conveyor (1) at a distance from the upper surface of the first conveyor (1)

(Continued)

equal to the maximum allowable height of baggage, thereby forming a physical barrier for oversized baggage. The system allows to check for the presence of living creatures on the conveyor belt, and for conformity with baggage handling system requirements. The system may further comprise a baggage check-in apparatus (3) to allow automatic baggage check-in by a passenger, including means for payment (12) of excess and/or overweight baggage. The invention further comprises a method for checking in of baggage items using the baggage drop system in accordance with the invention.

44 Claims, 7 Drawing Sheets

(51) Int. Cl.
    *G06Q 20/18*     (2012.01)
    *G06Q 50/30*     (2012.01)
    *G06Q 10/08*     (2012.01)
    *B64F 1/36*     (2017.01)

(52) U.S. Cl.
    CPC ............. *G06Q 20/18* (2013.01); *G06Q 50/30* (2013.01); *G06Q 10/08* (2013.01)

(58) Field of Classification Search
    USPC .................................. 235/382, 380, 375, 487
    See application file for complete search history.

(56) References Cited

U.S. PATENT DOCUMENTS

| | | | |
|---|---|---|---|
| 5,793,639 A | 8/1998 | Yamazaki | |
| 5,796,052 A | 8/1998 | Christmann | |
| 6,044,353 A * | 3/2000 | Pugliese, III | G06Q 10/02 235/375 |
| 2002/0157878 A1 | 10/2002 | Scott | |
| 2003/0221935 A1 * | 12/2003 | Barklin | B65G 17/345 198/357 |
| 2004/0035928 A1 * | 2/2004 | Anderson | B64F 1/366 235/385 |
| 2005/0115801 A1 * | 6/2005 | Holmgren | B65G 47/244 198/455 |
| 2008/0025470 A1 | 1/2008 | Streyl | |
| 2008/0035390 A1 | 2/2008 | Wurz | |
| 2009/0026722 A1 * | 1/2009 | Lau | B62B 3/00 280/79.11 |
| 2010/0018839 A1 | 1/2010 | Tan | |
| 2010/0078475 A1 | 4/2010 | Lin et al. | |
| 2011/0231212 A1 * | 9/2011 | Hurley | G06Q 10/02 705/5 |
| 2012/0098642 A1 * | 4/2012 | Krawczewicz | G06K 19/07707 340/10.1 |
| 2013/0211864 A1 | 8/2013 | Sanderson et al. | |
| 2016/0280469 A1 * | 9/2016 | Tsujimoto | B65G 47/52 |

FOREIGN PATENT DOCUMENTS

| | | |
|---|---|---|
| CN | 201662832 U | 12/2010 |
| CN | 102063751 A | 5/2011 |
| EP | 0486973 B1 | 9/1996 |
| EP | 2114767 A1 | 11/2009 |
| EP | 1725451 B1 | 6/2011 |
| JP | 2008233961 A | 10/2008 |
| SU | 1315992 A1 | 6/1987 |
| WO | 2002015115 A1 | 2/2002 |
| WO | 2004050480 A1 | 6/2004 |
| WO | 2005087590 A1 | 9/2005 |
| WO | 2008082300 A1 | 7/2008 |
| WO | 2012012841 A1 | 2/2012 |

OTHER PUBLICATIONS

Office Action issued in CN Application No. 201710047120.0 dated Feb. 3, 2020.

\* cited by examiner

METHOD AND SYSTEM FOR DEPOSITING AND CHECKING OF BAGGAGE INTO AIRLINE FLIGHTS

CROSS-REFERENCE TO RELATED APPLICATIONS

This application is a national stage application International Patent Application No. PCT/NL2013/050251, filed Apr. 3, 2013, entitled "METHOD AND SYSTEM FOR DEPOSITING AND CHECKING OF BAGGAGE INTO AIRLINE FLIGHTS", which claims priority to Netherlands Application No. 2008607, filed Apr. 5, 2012, and entitled "METHOD AND SYSTEM FOR DEPOSITING AND CHECKING OF BAGGAGE INTO AIRLINE FLIGHTS", all of which are incorporated by reference in their entireties herein.

FIELD OF THE INVENTION

The present invention relates to a method and system for depositing and checking of baggage into airline flights.

BACKGROUND OF THE INVENTION

At airports, passengers usually have to check in and deposit their baggage prior to the boarding procedure. In this process, a label is affixed to the baggage, and the baggage is subsequently deposited and taken away on a conveyor system to a baggage processing area. In the processing area the baggage is sorted on the basis of the label, and more specifically on the basis of flight number and/or baggage characteristics, and is ultimately placed on board of the correct aircraft.

Until recently, the checking in and depositing of baggage was handled by an airline employee or a member of the ground staff. Presently, passengers without hold baggage and with or without carry-on baggage can check in independently and without the assistance of an airline employee or a member of the ground staff, using for instance Common Use Self-Service (CUSS) check-in kiosks. Although such kiosks may also be used by passengers with hold baggage, depositing hold baggage has to be carried out with the assistance of an airline employee or a member of the ground staff. These will furnish the baggage with a label, assess its weight and transportability and ultimately take receipt of that baggage.

The above described known method of checking in and depositing baggage requires the assistance of an airline employee or a member of the ground staff, each of which is manning a check-in desk. The required number of desks at airports is determined by the maximum number of baggage items that are expected to be checked in and deposited simultaneously. The number of check-in desks needed therefore is large whereas most of them are used infrequently and therefore ineffectively. The desks take up a substantial part of the available terminal space, making it difficult to expand (baggage) handling capacity within existing terminals. Furthermore, the need for staffing makes this known method of checking in and depositing baggage a very expensive one. To keep costs under control, the availability of desks and staffing is kept limited, eventually resulting in long passenger waiting queues.

A known system and method for checking passengers and baggage into airline flights is known from US 2004035928, which discloses the use of self-service electronic kiosks and baggage drop systems. A problem of the known baggage drop systems lies in the open nature of the conveyance system. Without the presence of supervision of an airline employee or member of the ground staff, it is impossible to prevent anyone from gaining access to forbidden and/or dangerous sections of the airport through the conveyance system, which is in direct connection with said sections. Especially for children, entering such forbidden and dangerous sections entails considerable hazards.

Closed baggage drop systems were subsequently developed in order to prevent said situations. Such closed systems are disclosed for instance in CA 2186076 and EP 2114767. Important drawback of closed baggage drop systems is that they require substantial alterations to the existing infrastructure present at airports and hence are relatively expensive. Furthermore, closed baggage drop systems are of higher complexity than the open-natured systems and the associated purchase cost is therefore higher. The savings in wages for airline employees or members of ground staff may therefore be outweighed by the high cost of purchase and installation of these closed baggage drop systems.

Other systems have been disclosed, all of which however rely on the attention of an operator or other personnel, and as such are prone to errors.

It is an object of the present invention to provide an open-type baggage drop system and method without the disadvantages and limitations of known open and closed baggage drop solutions.

BRIEF DESCRIPTION OF THE INVENTION

The present invention provides an improved airport check-in process comprising self-service electronic check-in kiosks and self-service baggage drop systems. The electronic kiosks may be provided in various locations around the terminal to enable passengers to obtain boarding passes and perform check-in.

In an aspect of the invention, a baggage drop system for depositing and checking of baggage into airline flights is provided, the system comprising a first conveyor, equipped with a static or dynamic weighing scale, comprising multiple, spaced apart load cells, and computing means adapted to compare the output of the weighing scale with allowable baggage weights, and a substantially horizontal frame member, mounted above the first conveyor at a distance from the upper surface of the first conveyor equal to the maximum allowable height of baggage, thereby forming a physical barrier for oversized baggage. The baggage drop system provides a secure method for checking in baggage.

According to the invention, the stable baggage weight is checked with the baggage handling system requirements. Baggage which is too light or too heavy to be taken away on a conveyor system to a baggage processing area will be rejected and returned to the passenger by the baggage drop system.

In accordance with another aspect of the invention, the stable baggage weight is checked with the baggage weight allowance, obtained from the airline departure control system. If the baggage is overweight, it will be rejected by the baggage drop system and returned to the passenger.

In a embodiment of the invention, a system is provided that further comprises spaced apart vertical members or walls, provided at a distance from each other equal to the maximum allowable width of baggage.

A system according to yet another embodiment of the invention comprises a frame of spaced apart vertical members that support the substantially horizontal frame member, the frame having dimensions such that the space enclosed by the upper surface of the first conveyor and the frame members has a surface area equal to the maximum allowable cross-sectional surface area of baggage. The vertically extending frame member(s) could either be mounted to the (side guarding of) the first conveyor or to the floor underneath this first conveyor. The frame, and in particular the horizontal member thereof, functions as a physical barrier for predetermined oversized baggage items, which also reduces the risk that living creatures—accidentally or intentionally—enter the baggage processing area via the conveyor system.

According to an embodiment of the invention wherein the frame is constructed from one component only, such a frame is manufactured such that it forms a gate, optionally in combination with one or two adjacently positioned check-in desks. All cabling necessary for the correct functioning of the baggage check-in apparatus is preferably held and concealed in the frame.

In accordance with a further preferred embodiment of the invention, the baggage drop system further comprises a photoelectric cell mounted at the downstream end of the first conveyor. More preferably, the first conveyor is equipped with at least two photoelectric cells arranged in a spaced apart configuration in the moving direction of the first conveyor, whereby the spacing is substantially equal to the maximum allowable length of the baggage. This embodiment allows to perform a check on the length of baggage items and prevent too long (oversize) baggage from entering the baggage handling system. A load is transported by the first conveyor over a very short distance. The first conveyor belt is stopped instantly once the photoelectric cell at the downstream end of the first conveyor system is triggered. Subsequently, the weight is determined once more by the static or dynamic weighing scale installed in said first conveyor system. As a result of the instant stopping of the conveyor belt subsequent to the photoelectric cell being triggered, the conveyor's load will vibrate during a limited period of time. If a baggage item is placed onto the conveyor belt, the readings from the load cells will—as a result of said vibrations—show different (more stable) characteristics than in case of a living creature. Only in case the (variations of the) readings are within predetermined limits, the baggage check-in process will be allowed to proceed.

The computing means preferably are adapted to compare the variation in the output of the load cells with an allowable variation. The output of the load cells is used to
  a. Check for the presence of living creatures on the first conveyor belt, purposed to prevent living creatures from entering the baggage processing area via the conveyor system;
  b. Check for conformity with baggage handling system requirements; and
  c. Check for conformity with the weight allowance When a living creature for instance enters the first conveyor belt, it is likely that the variation in the output of the load cells will be relatively large, due to movements of the living creature.

Furthermore, the baggage drop system and in particular the computing means thereof comprises a baggage check-in apparatus, comprising a computer with a graphical user interface and a display screen for the display of said interface and information concerning the process of baggage check-in. The computer is preferably adapted to identify and contact the airline departure control system to obtain baggage allowances and check-in the passenger's baggage, communicate with the baggage handling system, and/or run the software for the graphical user interface which guides the passenger through the baggage check-in process.

In accordance with yet another aspect of the invention, the baggage drop system, and in particular the baggage check-in apparatus comprises automatic baggage label and/or boarding pass reading means. These reading means could either be barcode reading means and/or QR code reading means and/or radio frequency identification chip reading means, depending on the type of baggage label used at the specific airport and by the specific airline. The computer is furthermore equipped with barcode reading software and/or QR code reading software and/or radio frequency identification chip reading software.

In accordance with a further preferred aspect of the invention, the baggage drop system comprises handheld barcode and/or QR code scanning equipment and/or digital camera equipment and means for storing this equipment. Passengers are to use said equipment to scan the barcode and/or QR code printed onto the baggage label and/or boarding pass manually and/or make a picture of the baggage label and/or boarding pass. The computer is equipped with barcode reading software and/or QR code reading software and/or optical character recognition software to extract the code corresponding with the baggage label.

In accordance with another aspect of the invention, the baggage check-in apparatus is mounted to the frame and more specifically either on the right-hand side of de left vertical frame member, or on the left-hand side of the right vertical member, or preferably on top of the horizontal frame member. Placement of the baggage check-in apparatus substantially above the first conveyor, makes it possible for passengers to easily and simultaneously receive instructions through the graphical user interface and at the same time follow said instructions. In case a check-in desk is present on one or both sides of the first conveyor, the horizontal frame member is preferably connected directly to the check-in desk(s), instead of via a vertical frame member to (the side guarding of) the first conveyor.

In accordance with yet another aspect of the invention, the baggage check-in apparatus is equipped with a motion and/or distance sensor, connected to the computer, to detect the presence of passengers in close vicinity of the baggage drop system and initiate the process of baggage check-in.

Furthermore, in accordance with yet another preferred embodiment of the invention, the first conveyor of the baggage drop system is lowered at the front end and/or angled, to facilitate the placing of baggage items by the passenger onto the conveyor belt.

Yet another embodiment of the invention provides a baggage drop system wherein the first conveyor, equipped with a static or dynamic weighing scale, starts running slowly and automatically as soon as weight is detected by the weighing scale, in order to facilitate the placing of baggage onto the conveyor belt even further. In another embodiment, the first conveyor starts running slowly and automatically as soon as the presence of a passenger in close vicinity of the baggage drop system is detected by means of the motion and/or distance sensor. This, in order to further facilitate the placing of baggage onto the conveyor belt by the passenger.

A further aspect of the invention relates to a baggage drop system wherein it is verified that the handheld barcode and/or QR code scanning equipment and/or digital camera equipment is correctly placed in the appropriate storage means by automatically or manually perform a scan action and/or take a picture. A barcode, QR code, text or image is placed inside the storage means, such that the barcode or QR code is scanned, or a picture is taken of the text or image if the equipment is placed correctly. The baggage check-in apparatus' computer is equipped with barcode reading software and/or QR code reading software and/or optical character recognition software and/or digital image analysis and processing software, which is used to confirm that the equipment is correctly placed in the storage means. If not, the passenger will be instructed through the graphical user interface to do so.

In accordance with yet another aspect of the invention, the baggage label is read by the passenger manually by means of a wireless handheld device, such as a mobile phone. The handheld device is equipped with a digital camera and used to make a picture of the baggage label. The device is furthermore equipped with barcode reading software and/or QR code reading software and/or optical character recognition software to extract the code corresponding with the baggage label. The handheld device is furthermore equipped with near field communication technology used to communicate with the baggage check-in apparatus, and more specifically the computer.

In accordance with a preferred embodiment of the invention, the baggage weight is determined by means of the static or dynamic weighing scale—integrated in the first conveyor, being equipped with multiple load cells. Condition for transporting the baggage item from the first to the second conveyor belt is that the measured weight is sufficiently stable. In case a living creature is positioned on the conveyor belt, the weight measurements show much larger fluctuations than in case of a non-moving object, such as a baggage item.

In accordance with an even further preferred aspect of the invention, the baggage drop system comprises a light grid, installed substantially vertically at the downstream end of the conveyor, the light grid being connected to the baggage check-in apparatus' computer. The light grid is preferably installed at the position of the photoelectric cell at the downstream end of the first conveyor system. The vibration of the conveyor's load as a consequence of the instant stopping of the first conveyor belt will not only result in unstable weight measurements, but also in the intermittent blockage of (part of) the light grid. For living creatures, this blockage shows different characteristics than for rigid objects, such as baggage items. By monitoring the output of the light grid, living creatures can be prevented from entering forbidden and dangerous sections of the airport. It must be mentioned that some baggage as a result of the instant stopping of the first conveyor belt will also exhibit atypical and intermittent blockage of (part of) the light grid. This is the case for instance with very round-shaped baggage. Such baggage is unfit for automatic handling and hence may not be taken away on a conveyor system. It must therefore be rejected by the baggage drop system. Apart from preventing living creatures from entering the baggage processing area via the conveyor system, the light grid also functions as a transportability check purposed to prevent unfit baggage from being handled automatically.

In accordance with yet another aspect of the invention, the output of the light grid is monitored continuously, even when no blockage is to be expected. As such, the light grid functions as a security gate. If blockage of (any part of the) light grid is detected, a warning signal is sent out by the baggage drop system According to a further aspect of the invention, a passenger will be offered the possibility to accept the corresponding charges in case the stable baggage weight exceeds the obtained weight allowance. If accepted, the excess baggage fee is transmitted to a payment device installed in the baggage check-in apparatus to process the transaction.

Another aspect of the invention relates to a system wherein the computer of the baggage check-in apparatus accesses the airline's website, and more in particular the payment section of said website, after the passenger has accepted to pay the excess baggage fee. The passenger is subsequently prompted to complete the payment transaction online. In accordance with a further aspect of the invention, after acceptance of the excess baggage fees, the passenger is instructed to wait for assistance of an employee of the airline or a member of the ground staff. This employee or staff member carries a mobile payment device at which the passenger can fulfil the requested payment. The graphical user interface requires input of the employee or staff member, and more in particular the confirmation of fulfillment of the payment process, before the baggage check-in process is continued.

In accordance with another aspect of the invention, a stand-alone payment terminal—equipped with a computer—is provided in the near vicinity of the baggage drop system or systems. At this terminal, having accepted to pay the excess baggage fee, passengers can fulfil payment after completion of the baggage drop process. The passenger preferably identifies himself/herself by for instance scanning the barcode and/or QR code printed on his boarding pass or baggage claim tag and fulfil payment using cash, credit card or debit card. Once payment has been completed, the computer is used to identify and contact the airline departure control system to alter the status of the code corresponding with the baggage label, which is attached to the overweight baggage from 'inactive' to 'active'.

In case all weight requirements are met, the baggage is in a particular embodiment transported from the first onto the second conveyor belt. Using a photoelectric cell at the end of the side guarding of the first conveyor and at least one photoelectric cell mounted at the side guarding of the second conveyor, the length of the baggage item is determined. In case the length is within limits, successful bag drop is confirmed and the baggage is taken away on a conveyor system to a processing area. If not, the baggage is returned to the passenger by the baggage drop system.

In accordance with yet other aspect of the invention, baggage is transported backward and forward over the first conveyor belt. Using photoelectric cells mounted to the side guarding and near the beginning (upstream end) and the (downstream) end of the first conveyor, with a spacing substantially equal to the maximum allowable length of baggage to be taken away on a conveyor system to a processing area, it is determined whether or not the baggage item's length is within limits. If the latter is not the case, the baggage will be returned to the passenger by the baggage drop system. If the baggage length is however within limits, successful bag drop is confirmed and the baggage is taken away on a conveyor system to a processing area.

According to another aspect of the invention, after being transported from the first onto the second conveyor belt, the baggage is checked by means of an infrared camera system. Typically, baggage items show relatively low average and maximum temperature values as compared to most living creatures. By monitoring the output of the infrared camera system, the risk of living creatures to be taken away on a conveyor system and enter forbidden and dangerous sections of the airport is minimized. In case the conveyor's load is classified as a living creature, movement of the second belt is stopped and a warning signal is sent out by the baggage drop system. Else, successful bag drop is confirmed and the baggage item is taken away on a conveyor system to a processing area.

In accordance with a further aspect of the invention, after being transported from the first onto the second conveyor belt, the baggage is checked further for length and/or shape and/or movement and/or vibrations using a 3-dimensional laser measurement system and/or light grid and/or motion sensor and/or ultra wideband radar to further reduce the risk of living creatures and baggage unfit for automatic handling to be taken away on a conveyor system to forbidden and dangerous sections of the airport.

In another embodiment of the invention, the passenger is prompted to identify himself by scanning or reading his boarding pass as part of the baggage check-in process. The boarding pass could either be a traditional paper boarding pass, or an electronic boarding pass, which may be received for instance on a cell phone or personal digital assistant. Hereto, the baggage check-in apparatus is equipped either with handheld or built-in barcode and/or QR code scanning equipment and/or a digital camera used to make a picture of the boarding pass. The computer is furthermore equipped with barcode reading software and/or QR code reading software and/or optical character recognition software.

In accordance with another embodiment, the baggage check-in apparatus is equipped with a claim tag printer to issue a claim tag to the passenger after successful completion of the baggage check-in process. In still another embodiment, a barcode and/or QR code is printed onto the claim tag, which has shape and dimensions substantially similar to those of a credit card. The claim tag may be used to fulfil payment of excess baggage fees at the stand-alone payment terminal.

Another aspect of the invention provides a baggage drop system that is equipped with an exit door, positioned above and at the downstream end of the conveyor at which the length of the baggage item is determined. The exit door comprises an automatic opening and closing mechanism and a control circuit to control said mechanism. The exit door is opened if all weight requirements are met, the baggage length is within limits and it is confirmed that no living creature is positioned on the conveyor belt. Subsequently, the baggage is discharged from said conveyor and taken away on a conveyor system to a processing area. Shortly after discharging of the baggage, the exit door will be closed again and successful bag drop is confirmed.

In accordance with another aspect of the invention, the baggage drop system is furthermore equipped with an entry door, positioned above and at the upstream end of the first conveyor. The entry door comprises an automatic opening and closing mechanism and a control circuit to control said mechanism. The entry door is opened if the presence of a passenger in close vicinity of the baggage drop system is detected by means of the motion and/or distance sensor, and/or if a passenger has successfully identified himself by scanning or reading his boarding pass. The entry door will be closed if the baggage check-in process is completed or aborted and/or presence of a passenger in close vicinity of the baggage drop system is no longer detected.

Preferably, the self-service electronic check-in kiosks and baggage drop system in accordance with the invention includes a passport reader, a printer for printing boarding passes, a touch-screen, and optionally in some cases a card reader device and a baggage label printer. Baggage labels may be obtained by the passenger at the self-service baggage drop system. Depending on airport and airline practice, the baggage labels preferably are equipped with a barcode and/or QR code and/or radio frequency identification (RFID) chip. One or more of the baggage drop systems according to the invention are preferably located near the check-in kiosks but separated therefrom so that passengers will first check-in at a self-service electronic check-in kiosk, and subsequently move to a baggage drop system to check in and deposit their baggage.

In another aspect of the invention, baggage labels are preferably obtained by the passenger either at the electronic kiosks—if equipped with a baggage label printer, or at stand-alone self-service baggage label print kiosks. The baggage drop systems in accordance with the invention are preferably located either near the baggage label print kiosks, or near the check-in kiosks (whichever is applicable) but separated from said kiosks so that passengers will first check-in at a check-in kiosk, then (if applicable) proceed to a baggage label print kiosk, and ultimately move to a baggage drop system of the invention to check in and deposit their baggage.

In yet another aspect of the invention, at the self-service electronic check-in kiosk as much information is gathered as possible, to facilitate the process of baggage check-in at the baggage drop system. For instance, during the self-service check-in process passengers will provide information such as the number of bags to check in. Passengers may also pay additional charges or fees during the check-in process to facilitate acceptance of example given overweight or excess baggage at the baggage drop system. As much information is gathered and process steps completed as possible, to minimize the time to be spent at the baggage drop system. Depending on legislation and common airport practice, security questions for instance may have to be answered by the passenger during check-in as well.

In accordance with another aspect of the invention, passengers may check-in remotely, such as over the Internet, and after arrival at the airport proceed directly to a baggage label print kiosk. In case of remote check-in, passengers preferably print the boarding passes themselves. Furthermore, passengers may pay additional charges for example given excess or overweight baggage, and answer security questions during the remote check-in process.

In another aspect of the invention, passengers do not obtain baggage labels at the airport, but remotely. They then either print the baggage labels themselves—for example during the remote check-in process, or the labels are sent to the desired address by the airline or travelling agency prior to the date of departure.

DESCRIPTION OF FIGURES

The invention will now be described by way of example without however being limited thereto and with reference to the accompanying figures, in which.

DETAILED DESCRIPTION OF THE INVENTION

Throughout this application, the term "about" is used to indicate that a value includes the standard deviation of error for the device or method being employed to determine the value.

The articles "a" and "an" are used herein to refer to one or to more than one, i.e. to at least one of the grammatical object of the article. By way of example, "a door" means one door or more than one door.

Throughout this application, the term "substantially" means more than 90% of the indicated value or property.

Figure 1:
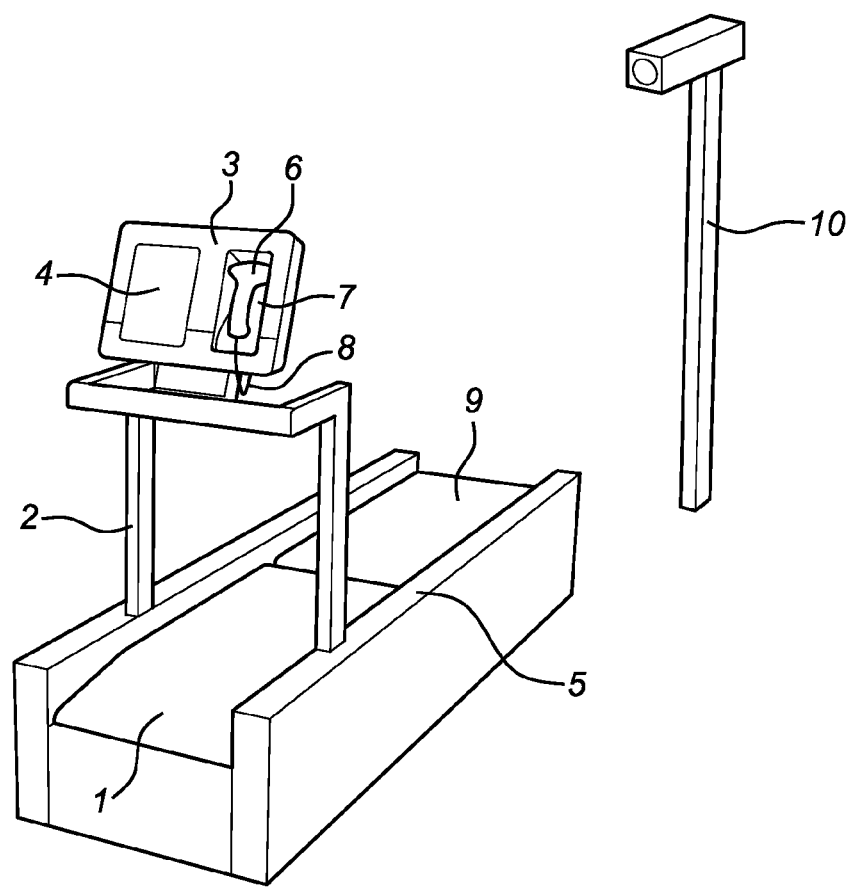
FIG. 1 is a perspective view of a baggage drop system in accordance with and embodying some preferred principles of the present invention.

Referring to FIG. 1 there is illustrated an embodiment of the baggage drop system in accordance with the present invention. The baggage drop system comprises a (first) conveyor 1, lowered and angled at the front end. It furthermore comprises a baggage check-in apparatus 3, connected to a frame 2. The frame 2 in turn is connected to the side guarding 5 of conveyor 1. The baggage check-in apparatus 3 comprises a display screen 4 for the display of a graphical user interface. It furthermore comprises handheld scanning equipment 6, and means for storage of said equipment 7. Furthermore, there are connecting means 8 for connecting the handheld scanning equipment to the computer (not visible) inside the baggage check-in apparatus. The baggage drop system furthermore comprises a second conveyor 9, and an infrared camera system 10 focused at conveyor 9, for monitoring the (temperature of) the load of said conveyor.

Figure 2:
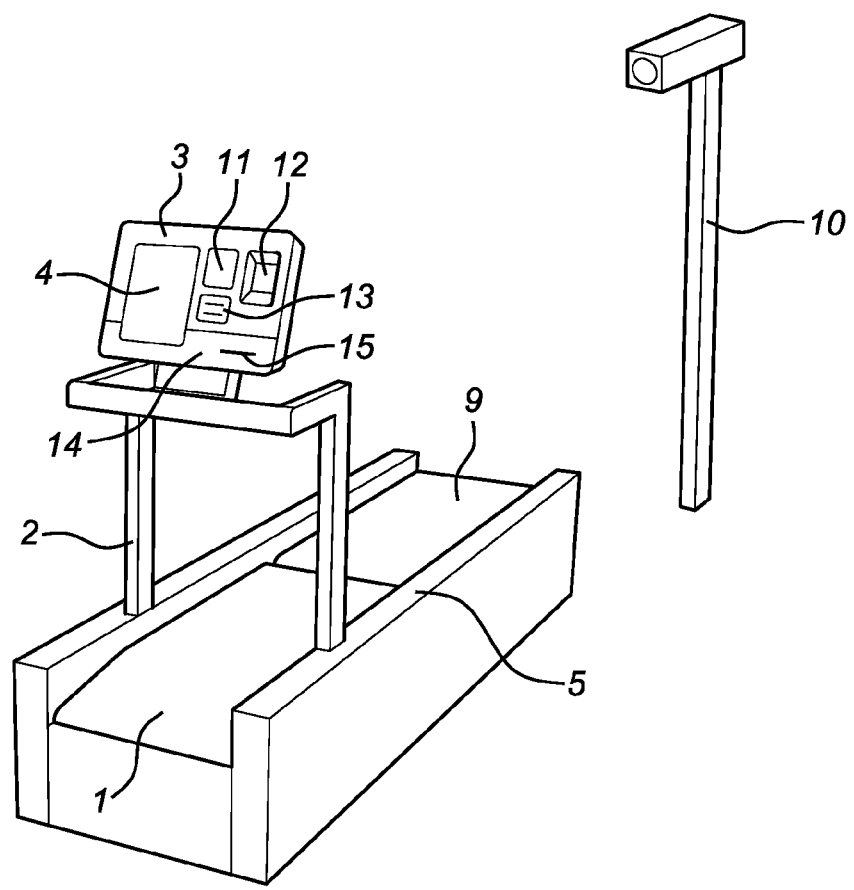
FIG. 2 is a perspective view of a baggage drop system in accordance with and embodying alternative preferred aspects of the present invention.

Referring now to FIG. 2, there is illustrated another embodiment of the baggage drop system in accordance with the present invention. The baggage drop system comprises a (first) conveyor 1, lowered and angled at the front end, a baggage check-in apparatus 3, connected to a frame 2. The frame 2 in turn is connected to the side guarding 5 of conveyor 1. The baggage check-in apparatus 3 comprises a display screen 4 for the display of a graphical user interface. It furthermore comprises a second conveyor 9, and an infrared camera system 10 focused at conveyor 9, for monitoring the (temperature of) the load of said conveyor. Furthermore, the baggage check-in apparatus comprises a reader 11 for reading (example given) boarding passes, a payment terminal 12, a printer 13 for printing baggage labels and/or claim tags, a motion sensor 14 and card reader device 15.

Figure 3:
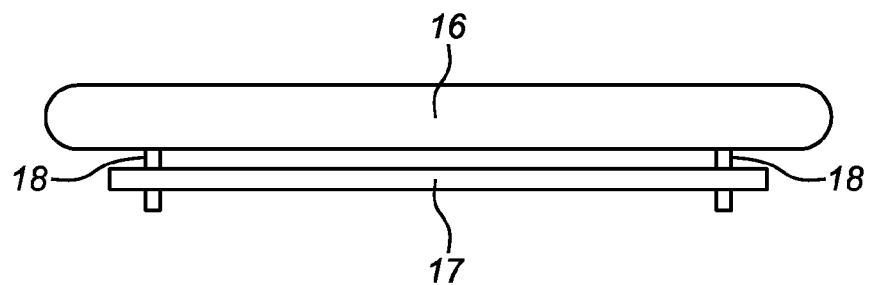
FIG. 3 is a side view of a conveyor, equipped with a static weighing scale, comprising multiple load cells.

Referring to FIG. 3, there is illustrated a conveyor 16, equipped with a static weighing scale 17, comprising multiple load cells 18 in accordance with the invention.

Figure 4:
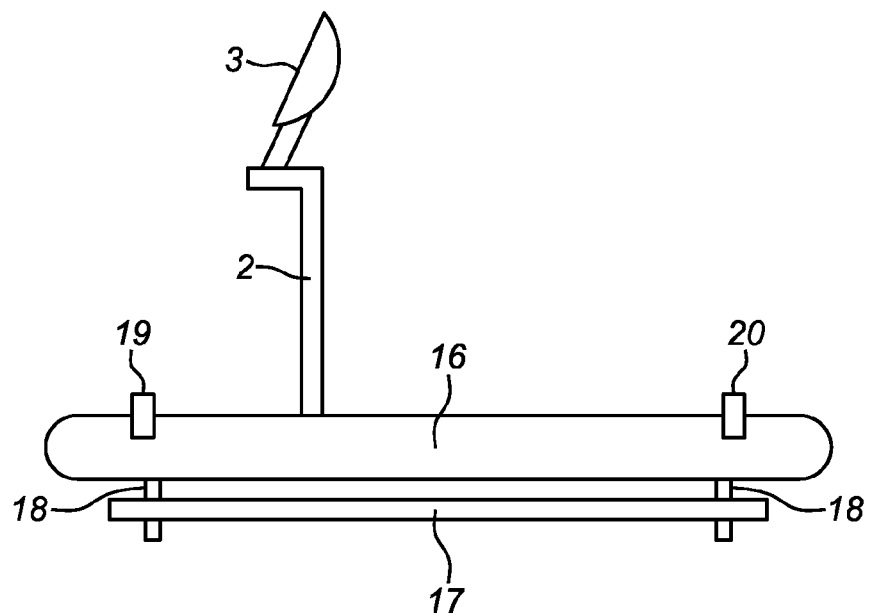
FIG. 4 is a side view of a baggage drop system in accordance with and embodying some preferred principles of the present invention.

Now referring to FIG. 4, there is depicted yet another embodiment of the baggage drop system in accordance with the present invention, comprising a conveyor 16, equipped with a static weighing scale 17 and comprising multiple load cells 18. The system furthermore comprises a baggage check-in apparatus 3, connected to a frame 2, one photo-electric cell 20 mounted at the downstream end of conveyor 16 and another photoelectric cell 19 mounted at the upstream end of conveyor 16. Photoelectric cells 19 and 20 are spaced apart, whereby the spacing is substantially equal to the maximum allowable length of baggage.

Figure 5:
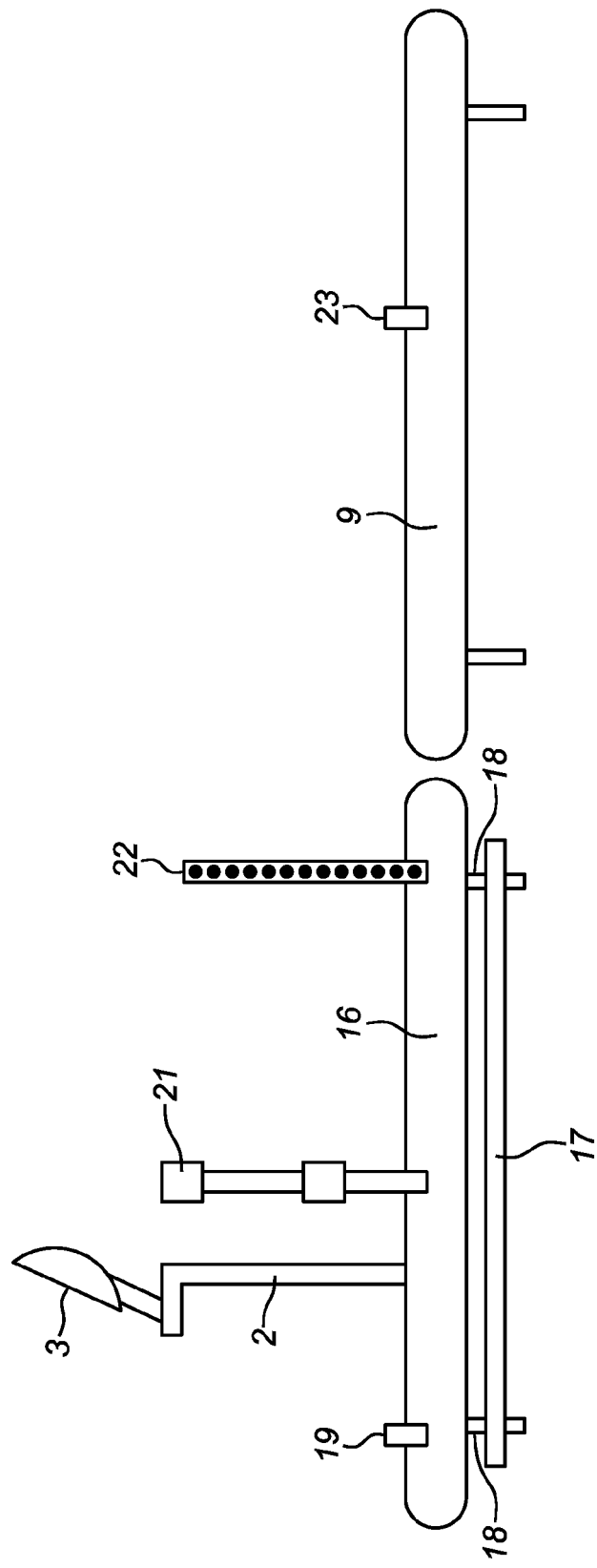
FIG. 5 is a side view of a baggage drop system in accordance with and embodying some other preferred principles of the present invention.

Referring to FIG. 5, there is illustrated another embodiment of the baggage drop system, comprising a conveyor 16, equipped with a static weighing scale 17 and comprising multiple load cells 18. The system furthermore comprises a baggage check-in apparatus 3, connected to a frame 2 and a second conveyor 9. Furthermore, the baggage drop system comprises automatic baggage label reading means 21, a light grid 22 mounted at the downstream end of conveyor 16 and a photoelectric cell 19 mounted at the upstream end of conveyor 16. A second photoelectric cell 23 is mounted to conveyor 9. Light grid 22 and photoelectric cell 19 are spaced apart, whereby the spacing is substantially equal to the maximum allowable length of baggage. Similarly, light grid 22 and photoelectric cell 23 are spaced apart, whereby the spacing is substantially equal to the maximum allowable length of baggage.

Figure 6:
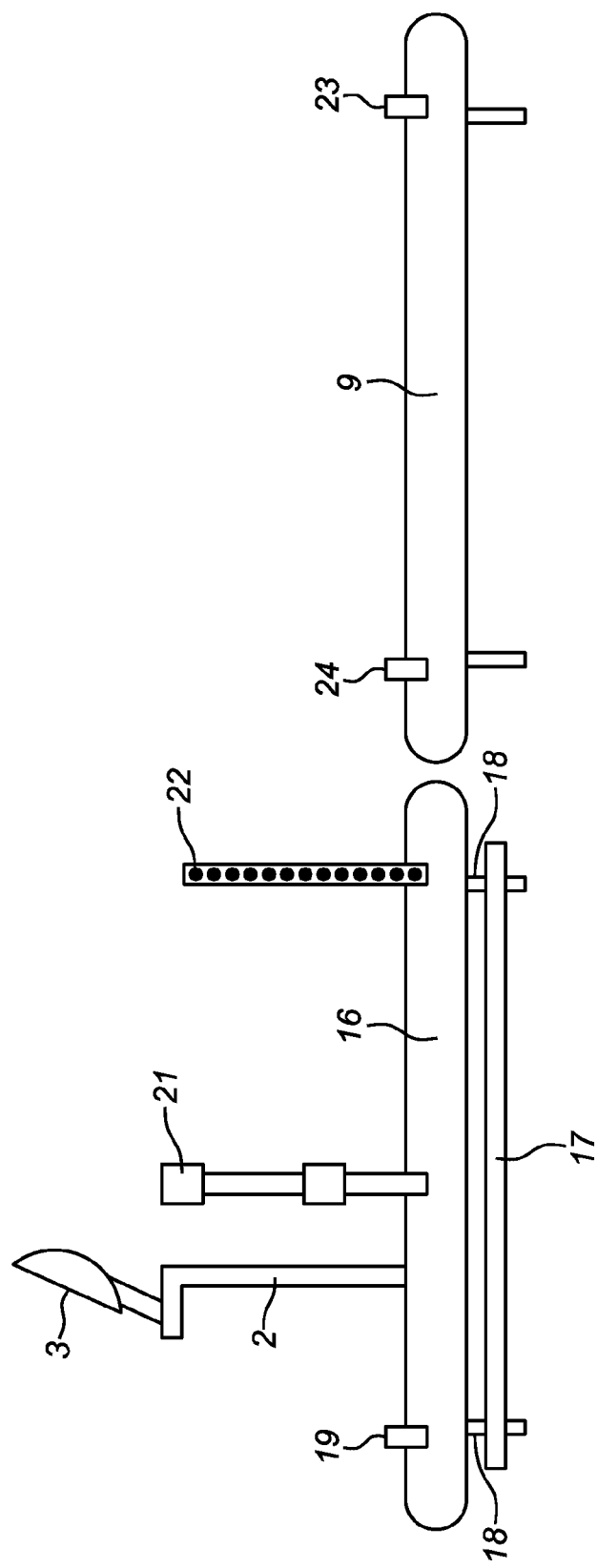
FIG. 6 is a side view of a baggage drop system in accordance with and embodying yet other preferred principles of the present invention.

In FIG. 6, an embodiment of the baggage drop system is depicted, comprising a baggage check-in apparatus 3, connected to a frame 2, a conveyor 16, equipped with a static weighing scale 17 and comprising multiple load cells 18, automatic baggage label reading means 21, a light grid 22 mounted at the downstream end of conveyor 16 and a second conveyor 9. The system furthermore comprises one photo-electric cell 23 mounted at the downstream end of conveyor 9 and another photoelectric cell 24 mounted at the upstream end of conveyor 9. Photoelectric cells 23 and 24 are spaced apart, whereby the spacing is substantially equal to the maximum allowable length of baggage.

Figure 7:
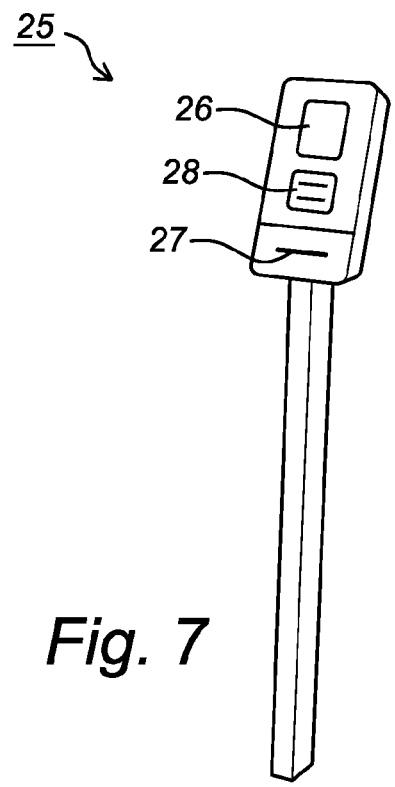
FIG. 7 is a perspective view of a stand-alone baggage label print kiosk.

FIG. 7 shows a stand-alone baggage label print kiosk 25, comprising a baggage label printer 28, a reader 26 for reading (example given) boarding passes and a card reader device 27.

Figure 8:
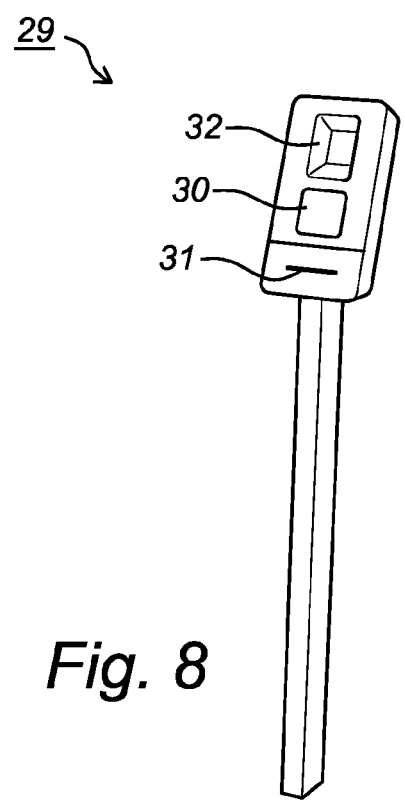
FIG. 8 is a perspective view of a stand-alone payment terminal.

FIG. 8 depicts a stand-alone payment terminal 29, comprising a payment device 32, a reader 30 for reading (example given) boarding passes and a reader device 31 for reading (frequent flyer) cards and/or claim tags.

Figure 9:
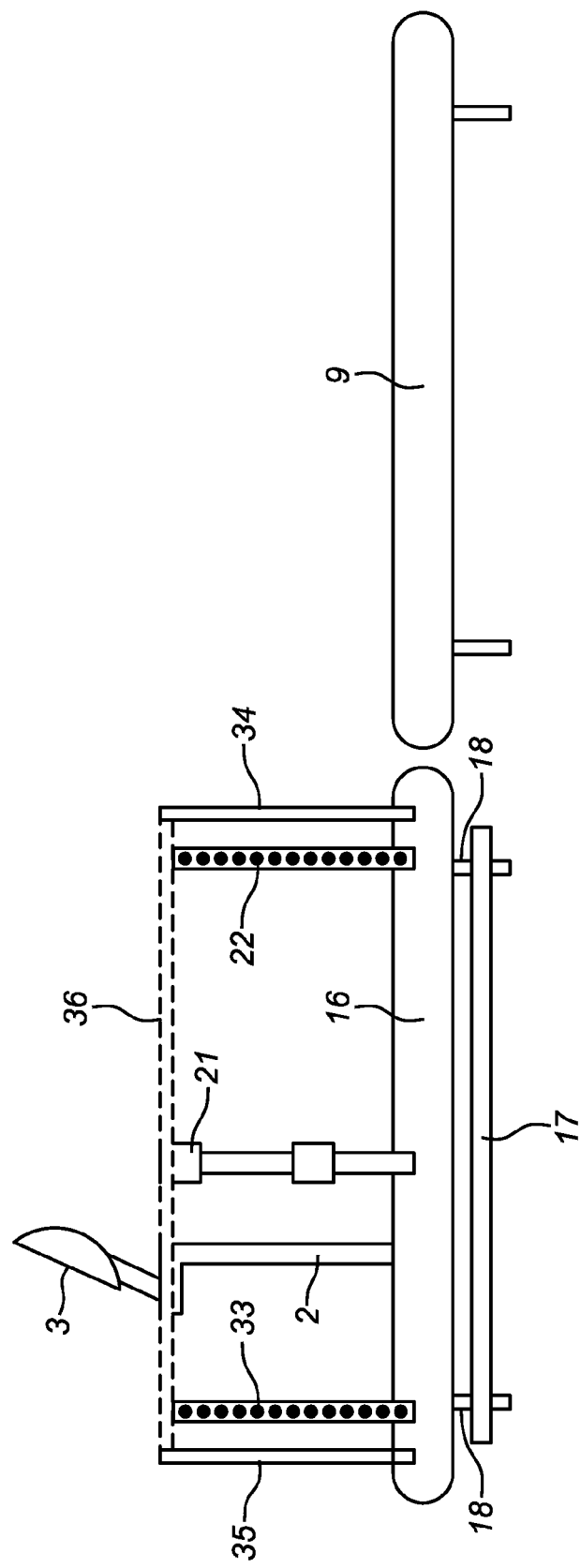
FIG. 9 is a side view of a baggage drop system in accordance with and embodying some preferred principles of the present invention.

Referring now to FIG. 9, there is illustrated still another embodiment of the baggage drop system, comprising a baggage check-in apparatus 3, connected to a frame 2, a conveyor 16, equipped with a static weighing scale 17 and comprising multiple load cells 18, automatic baggage label reading means 21, a light grid 22 mounted at the downstream end of conveyor 16 and a second conveyor 9. The system furthermore comprises a second light grid 33 mounted at the upstream end of conveyor 16, an exit door 34 positioned behind light grid 22 at the downstream end of conveyor 16 and an entry door 35 positioned in front of light grid 33. Furthermore, the baggage drop system comprises a cover 36, connecting entry door 35 and exit door 34 and purposed to close off the space between both doors, preventing access to conveyor 16 from either side except by means of either door.

The invention claimed is:

1. A baggage drop system for depositing and checking of baggage into airline flights, the system comprising:
   a first conveyor, equipped with a static or dynamic weighing scale, comprising multiple, spaced apart load cells;
   computing means adapted to compare an output of the weighing scale with allowable baggage weights;
   a substantially horizontal frame member, mounted above the first conveyor away from an end of the first conveyor at a distance from an upper surface of the first conveyor equal to a maximum allowable height of baggage thereby forming a physical barrier for oversized baggage; and a light grid, installed substantially vertically at a downstream end of the first conveyor, the light grid being connected to a computer of a baggage check-in apparatus.

2. The system according to claim 1, further comprising spaced apart vertical members or walls, provided at a distance from each other substantially equal to a maximum allowable width of baggage.

3. The system according to claim 1, comprising a frame of spaced apart vertical members that support the substantially horizontal frame member, the frame having dimensions such that a space enclosed by the upper surface of the first conveyor and the frame members has a surface area substantially equal to a maximum allowable cross-sectional surface area of baggage.

4. The system according to claim 1, wherein the first conveyor is equipped with at least two photoelectric cells arranged in a spaced apart configuration in a moving direction of the first conveyor, whereby a spacing is substantially equal to a maximum allowable length of the baggage.

5. The system according to claim 4, comprising a second conveyor placed after the first conveyor in a downstream direction of conveyance, whereby at least one photoelectric cell is mounted to a side guarding of the second conveyor.

6. The system according to claim 5, wherein the second conveyor comprises a substantially horizontal second frame member, mounted above the second conveyor at a distance from the upper surface of the second conveyor substantially equal to the maximum allowable height of baggage, thereby forming the physical barrier for oversized baggage.

7. The system according to claim 1, wherein the computing means are adapted to compare a variation in an output of the load cells with an allowable variation.

8. The system according to claim 1, wherein the computing means further comprise the baggage check-in apparatus and the computer comprises a graphical user interface and a display screen for a display of said interface and information concerning a process of baggage check-in.

9. The system according to claim 8, the computer being adapted to identify and contact an airline departure control system to obtain baggage allowances and check in baggage of a passenger, communicate with a baggage handling system, and/or run software for the graphical user interface which guides a passenger through the baggage check-in process.

10. The system according to claim 8, wherein the baggage check-in apparatus comprises automatic baggage label and/or boarding pass reading means.

11. The system according to claim 10, wherein the baggage label and/or boarding pass reading means are chosen from barcode reading means and/or QR code reading means and/or radio frequency identification chip reading means and/or digital camera equipment.

12. The system according to claim 10, wherein the baggage label and/or boarding pass reading means are handheld.

13. The system according to claim 10, where the baggage label and/or boarding pass reading means comprise wireless handheld devices, such as mobile phones, and the computer is equipped with near field communication technology.

14. The system according to claim 1, further comprising means for measuring, determining and analyzing at least one of: a temperature, a length, a shape, a movement, and a vibration of the load on at least one of: a first belt of the first conveyor and a second belt of the second conveyor.

15. The system according to claim 1, further comprising a baggage label printer, installed in the baggage check-in apparatus and/or in a standalone baggage label print kiosk and purposed to print a required number of baggage labels.

16. The system according to claim 1, further comprising a claim tag printer for issuing a claim tag to a passenger after successful completion of a baggage check-in process.

17. The system according to claim 1, wherein a baggage check-in apparatus comprises means for payment of excess and/or overweight baggage.

18. The system according to claim 17, wherein the means for payment are chosen from a built-in payment terminal, an online connection to a payment section of a website of an airline and a mobile payment device, and combinations of these.

19. The system according to claim 17, the means for payment comprising a stand-alone payment terminal located in a near vicinity of the baggage check-in apparatus, the stand-alone payment terminal being equipped with handheld or built-in barcode and/or QR code scanning equipment and/or a digital camera for making a picture of a boarding pass or claim tag, used to manually scan the barcode and/or QR code printed onto the boarding pass or claim tag and/or make a picture of said boarding pass or claim tag, the computer, being equipped with barcode reading software and/or QR code reading software and/or optical character recognition software to extract the code corresponding with the boarding pass or claim tag, the computer being connected to the boarding pass reading means, wherein the boarding pass or claim tag is paper or electronic.

20. The system according to claim 19, further comprising a motion and/or distance sensor, connected to the computer of the baggage check-in apparatus and adapted to detect a presence of passengers in close vicinity of the baggage check-in apparatus and initiate a process of baggage check-in.

21. The system according to claim 20, wherein the first conveyor is adapted to start running as soon as the presence of a passenger in close vicinity of the baggage drop system is detected by means of the motion and/or distance sensor.

22. The system according to claim 1, wherein the first conveyor is adapted to start running as soon as a weight is detected by the weighing scale.

23. The system according to claim 1, wherein a frame member conceals substantially all cabling necessary for a correct functioning of the baggage check-in apparatus.

24. The system according to claim 1, comprising means to automatically or manually perform a check as to whether a handheld barcode and/or QR code scanning equipment and/or digital camera equipment is correctly placed in appropriate storage means.

25. The system according to claim 24, wherein the storage means contains a barcode, QR code, text or image, such that the barcode or QR code is scanned, or a picture is taken of the text or image if the equipment is placed correctly, and the computer of the baggage check-in apparatus is equipped with barcode reading software and/or QR code reading software and/or optical character recognition software and/or digital image analysis and processing software.

26. The system according to claim 1, further comprising an exit door that is positioned above and at the downstream end of the first conveyor, the exit door comprising an automatic opening and closing mechanism and a control circuit to control said mechanism.

27. The system according to claim 1, further comprising an entry door that is positioned above and at an upstream end of the first conveyor, the entry door comprising an automatic opening and closing mechanism and a control circuit to control said mechanism.

28. A method for checking in of baggage items using a baggage drop system in accordance with claim 1, the method comprising the steps of:
    providing a baggage drop system in accordance with claim 1;
    placing at least one baggage item onto a belt of the first conveyor by a passenger;
    reading of a baggage label and/or boarding pass; and
    performing a weight analysis, comprising checking for a presence of living creatures on the first conveyor belt, checking for conformity with baggage handling system requirements, and checking for conformity with a weight and/or size allowance for the baggage.

29. The method according to claim 28, where the reading of the baggage label is carried out automatically, using barcode reading means and/or QR code reading means and/or radio frequency chip reading means.

30. The method according to claim 28, where the reading of the baggage label is carried out manually, by means of handheld barcode and/or QR code scanning equipment and/or digital camera equipment.

31. The method according to claim 28, wherein the reading of the baggage label is carried out using a wireless handheld device.

32. The method according to claim 28, wherein an additional check is performed, purposed to detect the presence of a living creature on the first conveyor belt and/or verify a transportability of the at least one baggage item.

33. The method according to claim 28, wherein the passenger performs a boarding pass read action at the baggage drop system.

34. The method according to claim 33, wherein a baggage label is printed at the baggage drop system after the passenger has performed the boarding pass read action.

35. The method according to claim 34, wherein the baggage label is printed either at an electronic check-in kiosk, or at a stand-alone baggage label print kiosk, being located in a vicinity of the baggage drop system.

36. The method according to claim 28, wherein the baggage label is obtained remotely, either by having the passenger printing the baggage label, or by having an airline or travelling agency send the baggage label to the passenger.

37. The method according to claim 28, wherein a possible payment for excess and/or overweight baggage takes place at the baggage drop system, either using a built-in payment terminal, or online using a payment section of a website of an airline.

38. The method according to claim 37, wherein the payment for excess and/or overweight baggage is carried out using a mobile payment device carried by an airline employee or member of a ground staff.

39. The method according to claim 37, wherein the payment for excess and/or overweight baggage is carried out at a stand-alone payment terminal, equipped with a computer and located in a vicinity of the baggage drop system.

40. The system according to claim 1, wherein the substantially horizontal frame member is mounted above the first conveyor at a distance from the upper surface of the first conveyor substantially equal to the maximum allowable height of baggage.

41. A system for depositing and checking of baggage into airline flights, the system comprising:
    a first conveyor;
    a barrier, mounted above and extending across the first conveyor at a distance from an upper surface of the first conveyor, the barrier arranged away from an end of the first conveyor and configured to form a physical barrier for oversized baggage; and
    a light grid, installed substantially vertically at a downstream end of the first conveyor, the light grid being connected to a computer of a baggage check-in apparatus.

42. The system according to claim 41, wherein the barrier comprises a frame member.

43. A barrier member for use in a baggage drop system of claim 41, the barrier member being adapted for mounting above and extending across the first conveyor at a distance from the upper surface of the first conveyor and configurable to form the physical barrier for oversized baggage.

44. A baggage drop system for depositing and checking of baggage into airline flights, the system comprising:
    a first conveyor;
    a barrier, mounted above and extending across the first conveyor at a distance from an upper surface of the first conveyor and configured to form a physical barrier for oversized baggage;
    a baggage check-in apparatus, comprising a computer with a graphical user interface (GUI) and a display screen for a display of the GUI and information concerning a process of baggage check-in, the baggage check-in apparatus comprising automatic baggage label and/or boarding pass reading means and being mounted on the barrier; and
    a light grid, installed substantially vertically at a downstream end of the first conveyor, the light grid being connected to the computer of the baggage check-in apparatus.

* * * * *